(12) United States Patent
Melliere et al.

(10) Patent No.: US 10,812,324 B2
(45) Date of Patent: Oct. 20, 2020

(54) TECHNOLOGIES FOR MANAGING APPLICATION CONFIGURATIONS AND ASSOCIATED CREDENTIALS

(71) Applicant: Interactive Intelligence Group, Inc., Indianapolis, IN (US)

(72) Inventors: Paul L. Melliere, Durham, NC (US); Timothy Eric Nicholson, Durham, NC (US); Aaron Bickell, Durham, NC (US); Brian Dill, Durham, NC (US)

( * ) Notice: Subject to any disclaimer, the term of this patent is extended or adjusted under 35 U.S.C. 154(b) by 322 days.

(21) Appl. No.: 15/638,214

(22) Filed: Jun. 29, 2017

(65) Prior Publication Data
US 2018/0006883 A1 Jan. 4, 2018

Related U.S. Application Data

(60) Provisional application No. 62/356,097, filed on Jun. 29, 2016, provisional application No. 62/356,095, filed on Jun. 29, 2016.

(51) Int. Cl.
*G06F 15/16* (2006.01)
*H04L 12/24* (2006.01)
(Continued)

(52) U.S. Cl.
CPC ...... *H04L 41/0806* (2013.01); *G06F 9/44505* (2013.01); *H04L 41/5096* (2013.01);
(Continued)

(58) Field of Classification Search
CPC ..... H04L 41/08; H04L 41/5096; H04L 63/06; H04L 63/062; H04L 63/20; H04L 67/34; G06F 9/44505
(Continued)

(56) References Cited

U.S. PATENT DOCUMENTS 8,402,525 B1   3/2013   Shah et al.
8,544,068 B2   9/2013   Yates et al.
(Continued)

FOREIGN PATENT DOCUMENTS

EP   2947569 A1   11/2015

OTHER PUBLICATIONS

International Search Report and Written Opinion for Application No. PCT/US17/40128, dated Sep. 22, 2017, 9 pages.
(Continued)

*Primary Examiner* — Zi Ye
*Assistant Examiner* — Mariegeorges A Henry (57) ABSTRACT

Technologies for managing application configurations and associated credentials of a unified collaboration application include a centralized hub computing device configured to install an integration of a cloud-based application and establish a link the integration to a unified collaboration application. To do so, the centralized hub computing device is configured to receive configuration input for the integration from a user, store the configuration in an input application configuration database of the centralized hub computing device, and enable the application integration such that a communication channel can be established between the integration and the unified collaboration application via the centralized hub computing device. Additional embodiments are described herein.

22 Claims, 5 Drawing Sheets

(51) Int. Cl.
*H04L 29/06* (2006.01)
*G06F 9/445* (2018.01)
*H04L 29/08* (2006.01)
*G06F 8/61* (2018.01)

(52) U.S. Cl.
CPC ............ *H04L 63/06* (2013.01); *H04L 63/062* (2013.01); *H04L 63/20* (2013.01); *H04L 67/34* (2013.01); *G06F 8/61* (2013.01); *H04L 63/10* (2013.01); *H04L 67/1097* (2013.01)

(58) Field of Classification Search
USPC .................................................. 709/222, 220
See application file for complete search history.

(56) References Cited

U.S. PATENT DOCUMENTS

| | | | |
|---|---|---|---|
| 8,566,157 B1* | 10/2013 | Zhang | ..................... G06F 9/542 |
| | | | 705/14.45 |
| 8,918,387 B1 | 12/2014 | Sokolov | |
| 9,037,692 B2 | 5/2015 | Ferris | |
| 9,430,207 B1* | 8/2016 | Bandhole | .................. G06F 8/38 |
| 2003/0135507 A1 | 7/2003 | Hind et al. | |
| 2003/0163686 A1 | 8/2003 | Ward et al. | |
| 2009/0300635 A1 | 12/2009 | Ferris | |
| 2012/0209947 A1 | 8/2012 | Glaser et al. | |
| 2013/0297680 A1 | 11/2013 | Smith et al. | |
| 2014/0122269 A1* | 5/2014 | Argue | ..................... G06Q 20/20 |
| | | | 705/21 |
| 2014/0181145 A1* | 6/2014 | Kamsamohideen | ........................ |
| | | | G06F 11/0706 |
| | | | 707/776 |
| 2014/0222940 A1 | 8/2014 | Icuduygu et al. | |
| 2014/0304509 A1 | 10/2014 | Ehrensvard | |
| 2014/0344456 A1 | 11/2014 | Buzbee et al. | |
| 2015/0188927 A1 | 7/2015 | Santhi et al. | |
| 2017/0078259 A1* | 3/2017 | Kumar | ..................... H04L 63/08 |
| 2017/0289135 A1* | 10/2017 | Uchil | .................. H04L 63/0838 |

OTHER PUBLICATIONS

Australian Government Examination Report No. 2 for Application No. 2017286888, dated Jan. 13, 2020, 3 pages.
Australian Government Examination Report No. 1 for Application No. 2017286888, dated Jun. 20, 2019, 3 pages.
New Zealand Intellectual Property First Office Action for Application No. 749831, dated Aug. 20, 2019, 4 pages.
Canadian Office Action for corresponding Application No. 3,032,883, dated Jan. 14, 2020, 4 pages.
New Zealand Intellectual Property Office Further Examination Report for corresponding Application No. 749831, dated Feb. 7, 2020, 3 pages.
Extended European Search Report for corresponding Application No. 17821303.9, dated Dec. 2, 2019, 11 pages.
Kostiainen, Kari, et al.; Credential Life Cycle Management in Open Credential Platforms (Short Paper), XP058005972, Scalable Trusted Computing, ACM, 2 Penn Plaza, Suite 701, New York, New York, 10121-0701, USA, Oct. 12, 2011. pp. 65-70.
Lomotey, Richard, et al.; MUBaaS: mobile ubiquitous brokerage as a service, World Wide Web, Baltzer Science Publishers, Bussum, NL, vol. 19, No. 1, Feb. 15, 2015, pp. 5-19.

* cited by examiner

TECHNOLOGIES FOR MANAGING APPLICATION CONFIGURATIONS AND ASSOCIATED CREDENTIALS

CROSS REFERENCE TO RELATED APPLICATIONS

The present application is related to, and claims the priority benefit of, U.S. Provisional Patent Application Ser. No. 62/356,095 filed Jun. 29, 2016 and U.S. Provisional Patent Application Ser. No. 62/356,097 filed Jun. 29, 2016, the contents of which are each hereby incorporated in their entirety into the present disclosure.

BACKGROUND OF THE DISCLOSED EMBODIMENTS

Cloud services provide a means of delivering agile, elastic, and scalable access to cloud-based applications (i.e., as opposed to an on-premise solution), which are managed by a cloud service provider. Cloud service providers offer some component of cloud computing, typically an infrastructure as a service (IaaS), a platform as a service (PaaS), or a software as a service (SaaS), to individual consumers or to enterprises. Such SaaS-based cloud service solutions may include web-based email services, hosted office suites, and document/interface collaboration services, to name a few examples.

Generally, to purchase and otherwise manage such cloud-based applications, a user accesses a cloud service provider's application marketplace, which provides an online storefront for users to access cloud-based services and software applications. However, present management technologies typically do not allow configuration information and access credentials to be retained for use across more than a single application, which can make managing configurations and credentials burdensome, in particular when dealing with different integrations of a unified collaboration application. Accordingly, there exists a need for improvements in technologies for managing application configurations and associated credentials of a unified collaboration application.

SUMMARY OF THE DISCLOSED EMBODIMENTS

In one aspect, a method for managing application configurations and associated credentials of a unified collaboration application includes receiving, by an application integration management platform of a centralized computing device, an indication from an end-user computing device that an integration of a cloud application is to be installed and linked to a unified collaboration application; installing, by the application integration management platform, the integration; receiving, by the application integration management platform, configuration input for the integration from the end-user computing device; storing, by the application integration management platform, the configuration in an input application configuration database of the application integration management platform; receiving, by the application integration management platform, an enablement message from the end-user computing device indicating the integration is to be enabled; and transmitting, by the application integration management platform, an enablement notification to an application provider of the cloud application, wherein the enablement notification is usable to identify the integration.

In some embodiments, installing the integration includes generating a unique identifier of the integration and saving an application record that includes the unique identifier of the integration to an available applications database of the application integration management platform, wherein the available applications database is usable by a cloud application marketplace to identify available applications.

In some embodiments, the method additionally includes broadcasting, by the application integration management platform and subsequent to installing the integration, another notification to one or more services managed by the application integration management platform, wherein the other notification is usable to identify the installed integration and perform a subsequent action. In other embodiments, the method additionally includes transmitting, by the application integration management platform, configuration setup information to the end-user computing device, wherein the configuration setup information is usable to display one or more user interface elements capable of requesting and receiving configuration input, and wherein receiving the configuration input for the integration from the end-user computing device comprises receiving the configuration input in response to the transmission of the configuration setup information.

In some embodiments, transmitting the configuration setup information includes transmitting at least one of environment resource configuration information, integration type configuration information, and access credential configuration information. In other embodiments, the method additionally includes storing, by the application integration management platform, the received configuration input in the application configuration database of the application integration management platform. In still other embodiments, the method additionally includes transmitting the enablement notification to the application provider of the cloud application includes transmitting the enablement notification with information usable to access the stored configuration input.

In some embodiments, transmitting the enablement notification to the application provider of the cloud application includes transmitting the enablement notification with information usable to identify credentials associated with the integration. In other embodiments, the method additionally includes receiving, by the application integration management platform, a response to the enablement notification from the application provider of the cloud application; and performing, by the application integration management platform, one or more provisioning operations.

In some embodiments, the method additionally includes establishing, by the application integration management platform, one or more communication channels with the unified collaboration application; and transmitting, by the application integration management platform, one or more messages to the unified collaboration application via the one or more communication channels. In other embodiments, the method additionally includes receiving, by a credential management platform of the centralized computing device, access credentials associated with the integration; storing, by the credential management platform, the received access credentials and an identifier of the integration in a credential database of the credential management platform; and transmitting, by the credential management platform, access credential information to the application provider of the cloud application, wherein the access credential information is usable to identify the access credentials associated with the integration.

In some embodiments, the method additionally includes receiving, by the credential management platform, an update to the access credentials; storing, by the credential management platform, the received update to the access credentials in the credential database of the credential management platform; transmitting, by the credential management platform, an updated credentials notification to one or more associated applications and one or more associated users, wherein the updated credentials notification includes a unique identifier usable to identify the updated credentials.

In another aspect, a centralized hub computing device for managing application configurations and associated credentials of a unified collaboration application includes one or more computer-readable medium comprising instructions and one or more processors coupled with the one or more computer-readable medium. The one or more processors are configured to execute the instructions to receive an indication from an end-user computing device that an integration of a cloud application is to be installed and linked to a unified collaboration application; install the integration at the centralized hub computing device; receive configuration input for the integration from the end-user computing device; store the configuration in an input application configuration database of the application integration management platform; receive a message from the end-user computing device indicating the integration is to be enabled; and transmit an enablement notification to an application provider of the cloud application, wherein the enablement notification is usable to identify the integration.

In some embodiments, installing the integration includes generating a unique identifier of the integration and saving an application record that includes the unique identifier of the integration to an available applications database of the application integration management platform, wherein the available applications database is usable by a cloud application marketplace to identify available applications. In other embodiments, the one or more processors are further configured to execute the instructions to broadcasting, by the application integration management platform and subsequent to installing the integration, another notification to one or more services managed by the application integration management platform, wherein the other notification is usable to identify the installed integration and perform a subsequent action.

In some embodiments, the one or more processors are further configured to execute the instructions to transmitting, by the application integration management platform, configuration setup information to the end-user computing device, wherein the configuration setup information is usable to display one or more user interface elements capable of requesting and receiving configuration input, and wherein receiving the configuration input for the integration from the end-user computing device comprises receiving the configuration input in response to the transmission of the configuration setup information.

In some embodiments, transmitting the configuration setup information includes transmitting at least one of environment resource configuration information, integration type configuration information, and access credential configuration information. In other embodiments, the one or more processors are further configured to execute the instructions to storing, by the application integration management platform, the received configuration input in the application configuration database of the application integration management platform. In other embodiments, to transmit the enablement notification to the application provider of the cloud application includes to transmit the enablement notification with information usable to access the stored configuration input.

In some embodiments, to transmit the enablement notification to the application provider of the cloud application includes to transmit the enablement notification with information usable to identify credentials associated with the integration. In other embodiments, the one or more processors are further configured to execute the instructions to receive a response to the enablement notification from the application provider of the cloud application; and perform one or more provisioning operations. In still other embodiments, the one or more processors are further configured to execute the instructions to establish one or more communication channels with the unified collaboration application; and transmit one or more messages to the unified collaboration application via the one or more communication channels.

In some embodiments, the one or more processors are further configured to execute the instructions to receive access credentials associated with the integration; store the received access credentials and an identifier of the integration in a credential database of the credential management platform; and transmit access credential information to the application provider of the cloud application, wherein the access credential information is usable to identify the access credentials associated with the integration. In other embodiments, the one or more processors are further configured to execute the instructions to receive an update to the access credentials; store the received update to the access credentials in the credential database of the credential management platform; and transmit an updated credentials notification to one or more associated applications and one or more associated users, wherein the updated credentials notification includes a unique identifier usable to identify the updated credentials.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
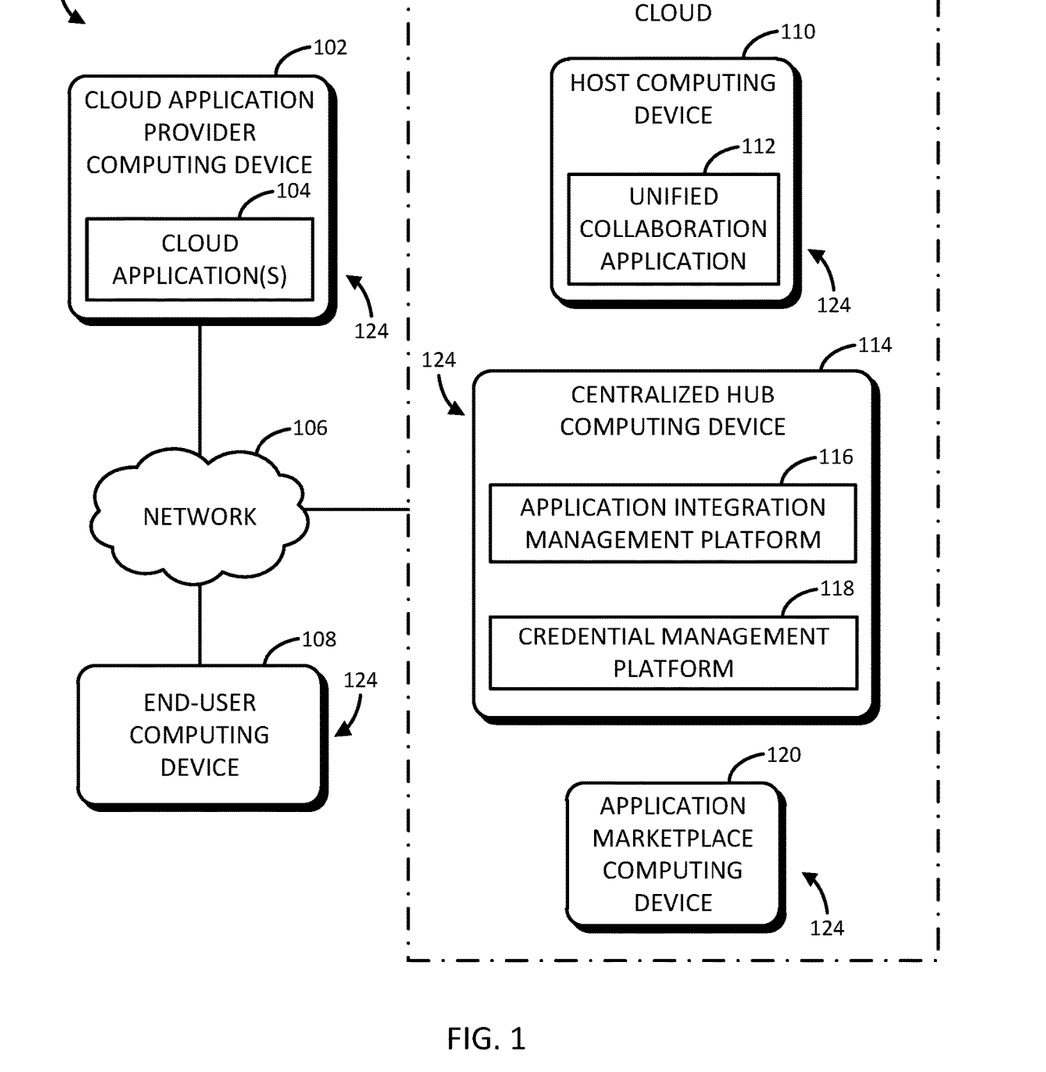
FIG. 1 is a simplified block diagram of at least one embodiment of a system for managing application configurations and associated credentials of a unified collaboration application that includes an end-user computing device and a cloud application provider computing device communicatively coupled to a centralized hub computing device via a network.

FIG. 1 is an illustrative centralized management system 100 for managing application configurations and associated credentials of a unified collaboration application which includes a cloud application provider computing device 102 and an end-user computing device 108, each of which are communicatively coupled to a centralized hub computing device 114 via a network 106. In use, as described in further detail below, the centralized hub computing device 114 is configured to coordinate the creation, configuration, and management of integrations between a unified collaboration application and other cloud-based applications/services. In other words, unlike present technologies, the coordination of such cloud-based applications (e.g., the cloud application(s) 104) with unified collaboration applications (e.g., the unified collaboration application 112, commonly referred to as a unified communication application) can be performed in a central location (i.e., the centralized hub computing device 114) for ease of user access.

In an illustrative example, a user (e.g., via an end-user computing device 108) interacts with the centralized hub computing device 114 to specify how one or more cloud-based applications/services 104 are to connect with the unified collaboration application 112. To do so, the centralized hub computing device 114 is configured to establish (see, e.g., the method 400 of FIGS. 4A and 4B) and manage a "link" between the cloud-based applications/services 104 and the unified collaboration application 112. Accordingly, as a function of the link, the user can coordinate the creation, configuration, and management of integrations between the unified collaboration application 112 and one or more cloud-based applications/services, such as the cloud-based applications/services 104, via the centralized hub computing device 114, without navigating to different parts of the unified collaboration application to make such changes.

As noted previously, the illustrative centralized management system 100 includes a cloud application provider computing device 102. It should be appreciated that, while only a single cloud application provider computing device 102 is illustratively shown, there may be any number of additional cloud application provider computing devices 102 in other embodiments. Additionally, while the cloud application provider computing device 102 is illustratively shown as a single computing device 124, it should be appreciated that, in other embodiments, the cloud application provider computing device 102 may be embodied as more than one computing device 124.

The illustrative cloud application provider computing device 102 includes one or more cloud applications 104. The cloud applications 104 may be embodied as any type of cloud-based application or service, such as, but not limited to, customer relationship management applications, workforce management applications, web-based email services, hosted office suites, document/interface collaboration services, load-balancing services, etc. Accordingly, it should be appreciated that such cloud applications 104 may be licensed/delivered using a software as a service (SaaS) based model. It should be further appreciated that such cloud applications 104 may be accessed by users via a web-browser or other thin/zero client application residing on the respective user's end-user computing device 108.

In addition to the cloud application provider computing device 102 and the end-user computing device 108, the illustrative centralized management system 100 additionally includes a host computing device 110 and a centralized hub computing device 114, as well as an application marketplace computing device 120 hosted in a cloud 122. The cloud 122 may be any network accessible cloud computing platform capable of facilitating the functions (e.g., hosting/deploying applications/services) described herein. Accordingly, the cloud 122 may be comprised of any number of compute/storage servers, as well as other network devices (e.g., switches, hubs, routers, access points, etc.), which may be housed in a data center, for example.

The cloud marketplace computing device 120 is configured to provide a platform for marketing (e.g., displaying available applications/services) and managing the billing of any cloud-based applications and/or services that may be managed by a provider of the cloud 122 or a third party (e.g., the vendor of the cloud application(s) 104 of the cloud application provider computing device 102). The host computing device 110 is configured to host the unified collaboration application 112. The unified collaboration application 112 may be embodied as any set of integrated communication services (e.g., instant messaging, voice, audio, web/video conferencing, desktop sharing, data sharing, speech recognition, email, etc.) which can be configured to provide a consistent unified user interface/user experience across multiple devices/media types.

Each of the cloud application provider computing device 102, the end-user computing device 108, the host computing device 110, the centralized hub computing device 114, and the cloud marketplace computing device 120 may be embodied as any type of computing device 124 capable of performing the respective functions described herein. For example, in some embodiments, end-user computing device 108 may be embodied as a desktop computer or a mobile computing device (e.g., a smartphone, a wearable, a tablet, a laptop, a notebook, etc.), while the cloud application provider computing device 102, the host computing device 110, and the centralized hub computing device 114 may be embodied as one or more servers (e.g., stand-alone, rack-mounted, etc.), compute devices, storage devices, and/or combination of compute blades and data storage devices (e.g., of a storage area network (SAN)) in a cloud architected network or data center.

It should be appreciated that, in some embodiments, similar to the cloud application provider computing device 102, the host computing device 110, the centralized hub computing device 114, and the cloud marketplace computing device 120 may include more than one computing device 124 (e.g., in a distributed computing architecture of the cloud 122), each of which may be usable to perform at least a portion of the functions described herein of the respective computing device 124. Accordingly, in some embodiments, one or more functions of the centralized hub computing device 114 as described herein may be executed on one or more computing devices 124 of the cloud 122, while one or more same, additional, or alternative functions of the centralized hub computing device 114 described herein may be executed on one or more other computing devices 124.

Figure 2:
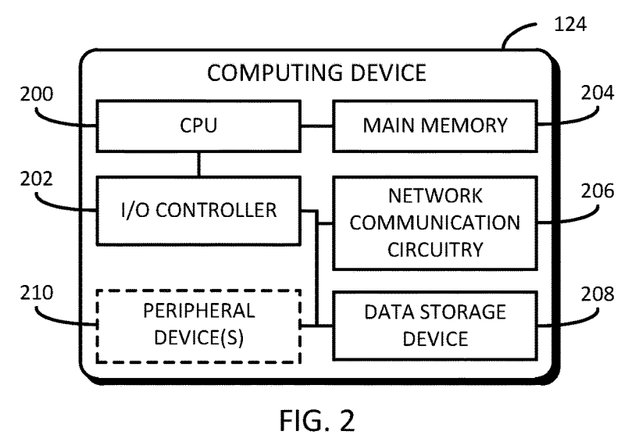
FIG. 2 is a simplified block diagram of at least one embodiment of the centralized hub computing device of the system of FIG. 1.

Referring now to FIG. 2, an illustrative computing device 124 (e.g., an illustrative one of the cloud application provider computing device 102, the end-user computing device 108, the host computing device 110, the centralized hub computing device 114, and the cloud marketplace computing device 120) includes a central processing unit (CPU) 200, an input/output (I/O) controller 202, a main memory 204, network communication circuitry 206, a data storage device 208, and, in some embodiments, one or more I/O peripherals 210. In some alternative embodiments, the computing device 124 may include additional, fewer, and/or alternative components to those of the illustrative computing device 124, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the respective computing device 124 may be predicated upon the type and intended use of the respective computing device 124. For example, the centralized hub computing device 114 may not include any peripheral devices 210; whereas the end-user computing device 108 may include multiple peripheral devices 210. Additionally, as described previously, the centralized hub computing device 114 may be comprised of more than one computing device 124. Accordingly, in such embodiments, it should be further appreciated that one or more of the computing devices 124 of the centralized hub computing device 114 may be configured as a database server with less compute capacity and more storage capacity relative to another of the computing devices 124 of the centralized hub computing device 114. Similarly, one or more other computing devices 124 of the centralized hub computing device 114 may be configured as an application server with more compute capacity relative and less storage capacity relative to another of the computing devices 124 of the centralized hub computing device 114.

The CPU 200, or processor, may be embodied as any combination of hardware and circuitry capable of processing data. In some embodiments, the computing device 124 may include more than one CPU 200. Depending on the embodiment, the CPU 200 may include one processing core (not shown), such as in a single-core processor architecture, or multiple processing cores, such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 124. Illustratively, the I/O controller 202 is configured to receive input/output requests from the CPU 200, and send control signals to the respective input/output devices, thereby managing the data flow to/from the computing device 124.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 124 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 124 to a computer network, as well as other devices, depending on the embodiment.

The data storage device 208 may be embodied as any type of computer hardware capable of the non-volatile storage of data (e.g., semiconductor storage media, magnetic storage media, optical storage media, etc.). Such data storage devices 208 are commonly referred to as auxiliary or secondary storage, and are typically used to store a large amount of data relative to the memory 204 described above.

The I/O peripherals 210 may be embodied as any type of auxiliary device configured to connect to and communicate with the computing device 124. Depending on the embodiment, the one or more I/O peripherals 210 may include a display, a microphone, a speaker, a mouse, a keyboard, a touchscreen, a camera, a printer, a scanner, etc. Accordingly, it should be appreciated that some I/O devices are capable of one function (i.e., input or output), or both functions (i.e., input and output).

In some embodiments, the I/O peripherals 210 may be connected to the computing device 124 via a cable (e.g., a ribbon cable, a wire, a universal serial bus (USB) cable, a high-definition multimedia interface (HDMI) cable, etc.) connected to a corresponding port (not shown) of the computing device 124 through which the communications made therebetween can be managed by the I/O controller 202. In alternative embodiments, the I/O peripherals 210 may be connected to the computing device 124 via a wireless mode of communication (e.g., Bluetooth®, Wi-Fi®, etc.) which may be managed by the network communication circuitry 206.

Referring back to FIG. 1, as noted previously, the cloud application provider computing device 102 and the end-user computing device 108 are each communicatively coupled to the cloud 122, or more particularly to the centralized hub computing device 114 of the cloud 122, via the network 106. The network 106 may be implemented as any type of wired and/or wireless network, including a local area network (LAN), a wide area network (WAN), a global network (the Internet), etc. Accordingly, the network 106 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc. It should be appreciated that the cloud application provider computing device 102, the end-user computing device 108, and the centralized hub computing device 114 may use different networks (e.g., LANs, provider networks, etc.) to connect to the backbone of the network 106 such that a number of communication channels can be established therein to enable communications therebetween.

The illustrative centralized hub computing device 114 includes an application integration management platform 116 and a credential management platform 118, each of which may be embodied as any combination of hardware, firmware, software, or circuitry usable to perform the functions described herein. The application integration management platform 116 and the credential management platform 118 include or otherwise have access to one or more computer-readable medium (e.g., the memory 204, the data storage device 208, and/or any other media storage device) having instructions stored thereon and one or more processors (e.g., the CPU 200) coupled with the one or more computer-readable medium and configured to execute instructions to perform the functions described herein. While the functionality of the application integration management platform 116 and/or the credential management platform 118 may be described herein as being performed by a particular component or set of components, it should be appreciated that, in other embodiments, the application integration management platform 116 and/or the credential management platform 118 may include additional and/or alternative components for performing the functions described herein.

Figure 3:
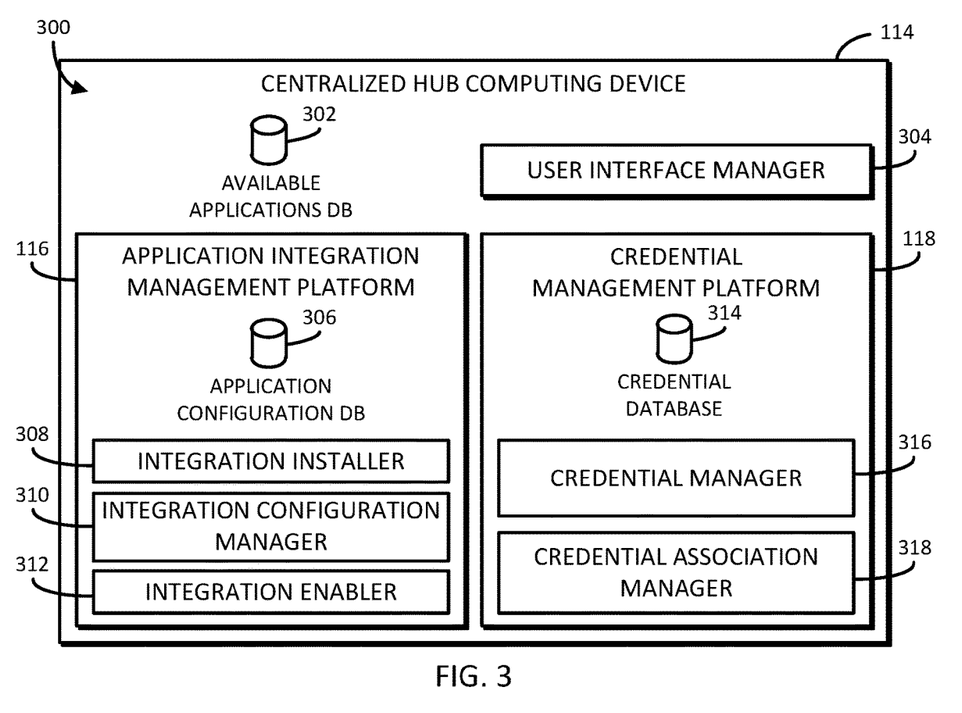
FIG. 3 is a simplified block diagram of at least one embodiment of an environment of the centralized hub computing device of FIG. 1.

Referring now to FIG. 3, an illustrative environment 300 of the centralized hub computing device 114 is shown. The illustrative environment 300 includes an available applications database 302, a user interface manager 304, and each of the application integration management platform 116 and the credential management platform 118. In some embodiments, access to the data provided to and/or generated as described herein may require authorization and/or that such data is encrypted while in storage and/or transit. Accordingly, in some embodiments, one or more authentication and/or encryption technologies known to those of skill in the art may be employed to ensure the storage and access to the data complies with any legal and/or contractual requirements.

It should be further appreciated that, in some embodiments, the data stored in the respective databases may not be mutually exclusive. In other words, certain data described herein as being stored in one database may additionally or alternatively be stored in another database described herein, or another database altogether. It should be further appreciated that, in some embodiments, the data may be stored in a single database, or an alternative database/data storage arrangement. Additionally, the illustrative databases described herein may be combined or further segregated, in other embodiments.

The user interface manager 304, which may be embodied as any combination of hardware, firmware, software, or circuitry usable to perform the functions described herein, is configured to interface with users, independent software vendors, and/or cloud-based application/service providers. It should be appreciated that, in some embodiments, the user interface manager 304 may be located on another computing device 124 of the cloud 122 to which the centralized hub computing device 114 is capable of communicating with (e.g., to provide/receive relevant data). To provide the interfaces, the user interface manager 304 is configured to generate, transmit, and receive network communications with code (e.g., hypertext markup language (HTML), JavaScript Object Notation (JSON), extensible markup language (XML), etc.) that is usable to render the user interface elements to a display of the user, such as may be used to provide information to and/or request feedback from the user, and receive requested feedback from the user.

For example, the user interface manager 304 may be configured to provide information usable to display a list (e.g., text, icons, graphics, etc.) of all the cloud services/applications (e.g., the cloud applications 104 of FIG. 1) which are capable of being integrated with a particular unified collaboration application (e.g., the unified collaboration application 112 of FIG. 1). In furtherance of the example, the user interface manager 304 may be configured to receive an indication from the user as to which cloud services/applications the user would like to install and/or configure. In some embodiments, the cloud services/applications which are available to be installed may be stored in the available applications database 302.

It should be appreciated that the cloud services/applications capable of being integrated with a particular unified collaboration application (i.e., the supported cloud services/applications) may be defined by the creator of each unified collaboration application. The supported cloud services/applications may be provided to the centralized hub computing device 114 in the form of a list of supported integration types (e.g., a file defining a name, description, and definition of a required configuration for each supported integration type), an indication of which may be stored in the available applications database 302. It should be appreciated that the application marketplace computing device 120 may be configured to read the contents of the available applications database 302 when marketing cloud services/applications in the marketplace.

In another example, upon a cloud service/application having been selected for configuration, the user interface manager 304 may be configured to display one or more user-input receiving elements requesting input from a user that is required to install, configure, enable, or disable a cloud service/application. Accordingly, the user interface manager 304 is configured to receive such user input and provide the received input to the necessary component for subsequent action to be undertaken based thereon. Additionally, in another example, the user interface manager 304 may be configured to display a status of each cloud service/application integrated into the unified collaboration application.

The illustrative application integration management platform 116 includes an application configuration database configured to store configurations (e.g., environment settings, identifiers, required resources, billing information, etc.) of the installed integrations. The illustrative application integration management platform 116 additionally includes an integration installer 308 configured to manage the installation of selected integrations, an integration configuration manager 310 configured to manage configuration of the installed integrations, and an integration enabler 312 configured to enable/disable installed and configured integrations. Accordingly, the application integration management platform 116 is configured to provide a central location for a user to install, configure, and enable integrations into a unified collaboration application. The configuration settings of the integrations may be stored in the application configuration database 306, in some embodiments.

The illustrative credential management platform 118 includes a credential manager 316 configured to create, update, and delete credentials associated with each integration and a credential association manager configured to manage the associations of the credentials with the respective integration(s). In other words, the credential management platform 118 is configured to provide a central location for a user to create and manage credentials for integrations of a unified collaboration application. The credentials and the respective associations may be stored in the credential database 314, in some embodiments.

Figure 4A:
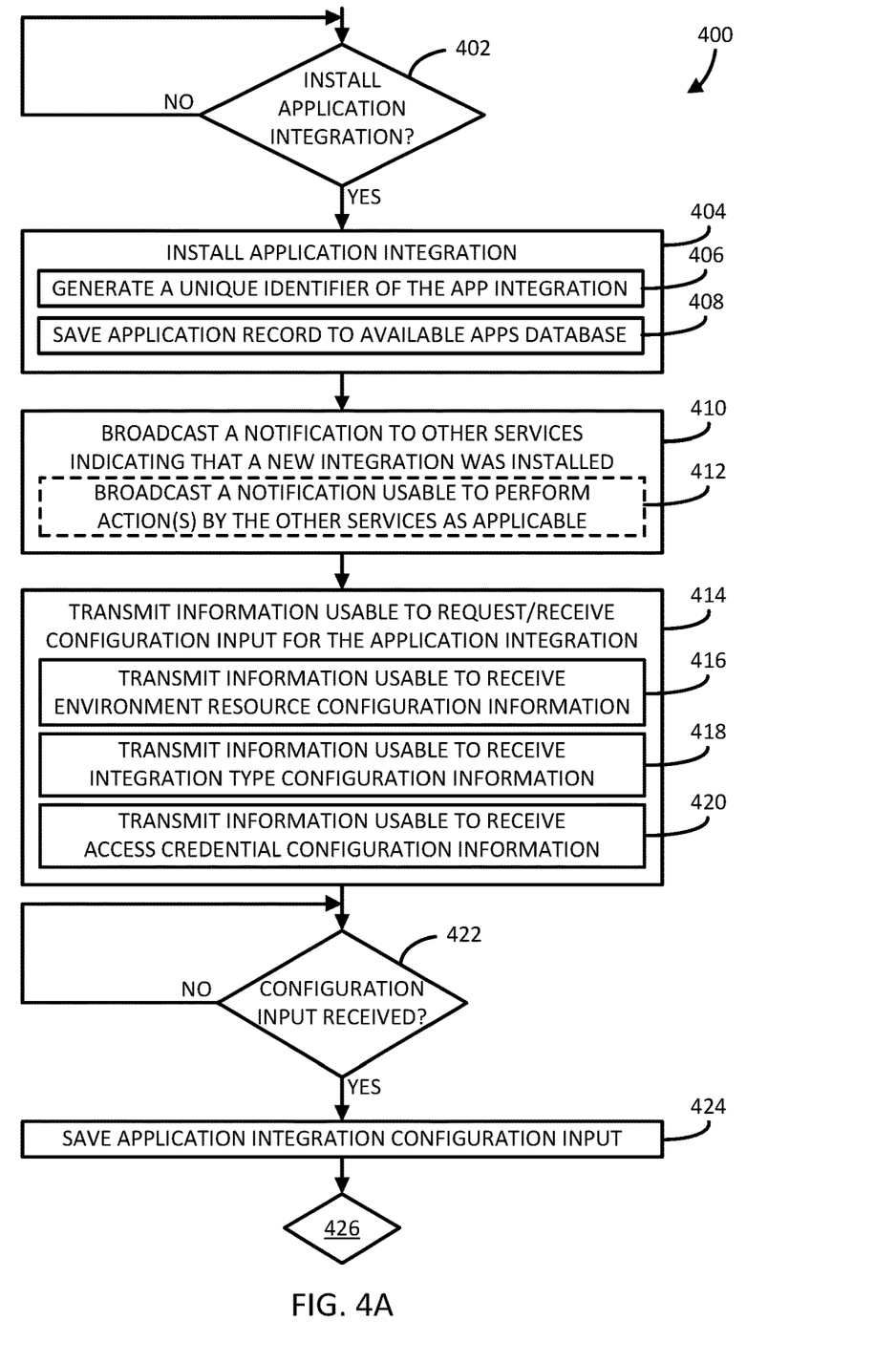
FIGS. 4A and 4B are a simplified flow diagram of at least one embodiment of a method for establishing a link between one or more cloud-based applications/services and a unified collaboration application that may be executed by the centralized hub computing device of FIGS. 1 and 3.
Figure 4B:
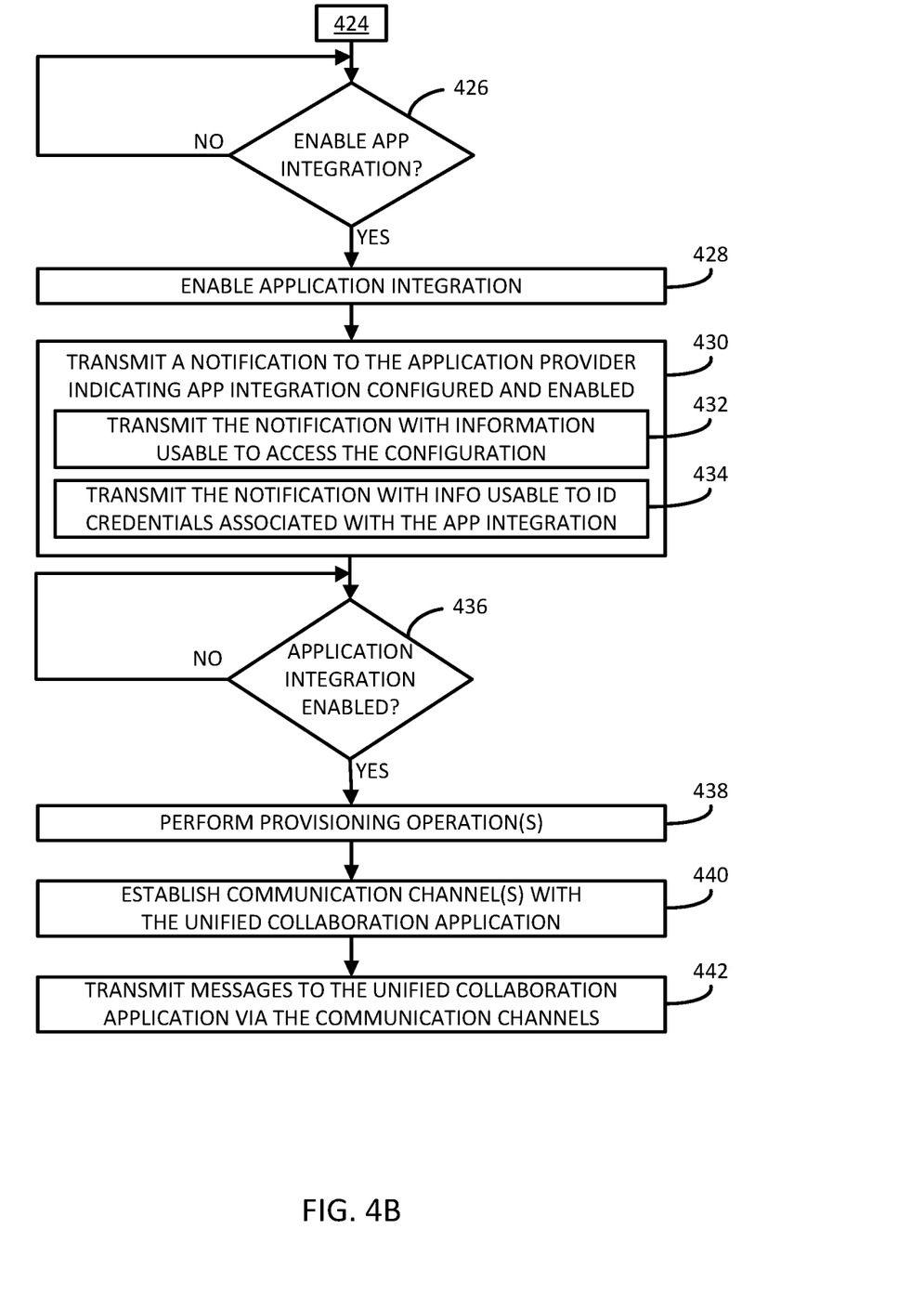

Referring now to FIGS. 4A and 4B, an illustrative method 400 is provided for establishing a link between one or more cloud-based applications/services and a unified collaboration application which may be executed by the centralized hub computing device 114, or more particularly the application integration management platform 116 of the centralized hub computing device 114. The method 400 begins in block 402, in which the application integration management platform 116 determines whether a request to install an application integration was received (e.g., as may be initiated by a user as described previously). If so, the method 400 advances to block 404.

In block 404, the application integration management platform 116 installs the application integration. In doing so, in block 406, the application integration management platform 116 generates a unique identifier of the application integration. Additionally, in block 408, the application integration management platform 116 saves an application record to an available applications database (e.g., the available applications database 302 of FIG. 3). The application record may include any information relating to the installed application, such as an integration type, a friendly name, the unique identifier, etc.

In block 410, the application integration management platform 116 broadcasts a notification to other services indicating that a new integration was installed. In block 412, the application integration management platform 116 may broadcast a notification that is usable by the receiving services to perform one or more actions, such as emailing or otherwise notifying an administrator that a new integration has been installed, collecting data associated with the integration, etc.

In block 414, the application integration management platform 116 transmits configuration setup information usable to display user interface elements capable of requesting and receiving configuration input from an end-user computing device (e.g., the end-user computing device 108 of FIG. 1) of that user. To do so, in block 416, the application integration management platform 116 transmits information usable to receive environment resource configuration information. Additionally, in block 418, the application integration management platform 116 transmits information usable to receive integration type configuration information. Further, in block 420, the application integration management platform 116 transmits information usable to receive access credential information.

It should be appreciated that the requested configuration information and associated user input elements may be displayed on an I/O peripheral device of the end-user computing device of that user, such that the requested information can be received from a user for the application integration. In block 422, the application integration management platform 116 determines whether the requested configuration input has been received. If the requested configuration input has been received, the method 400 advances to block 424, in which the application integration management platform 116 saves the application configuration information configuration input in an application configuration database (e.g., the application configuration database 306 of FIG. 3).

In block 426 of FIG. 4B, the application integration management platform 116 determines whether to enable the application integration, such as may be initiated by a user (e.g., by clicking a user interface element). It should be appreciated that, under certain conditions, the user may not choose to enable the application integration at this time. Under such conditions, the method 400 may exit until the user indicates they would like to enable the configured application integration, at which time the method 400 may resume at block 426. If the application integration management platform 116 determines the application integration is to be enabled, the method 400 advances to block 428. In block 428, the application integration management platform 116 enables the application integration, such as by calling the corresponding REST API endpoint.

In block 430, the application integration management platform 116 transmits a notification (i.e., an enablement notification) to the application provider of the cloud application corresponding to the application integration indicating the application integration has been configured and enabled. Additionally, in block 432, the application integration management platform 116 transmits the notification with information usable to access the configuration of the application integration, such as the identifier of the application integration and the integration type. Further, in block 434, the application integration management platform 116 transmits the notification with information usable to identify the credentials associated with the application, such as may be identified using a unique identifier. It should be appreciated that additional and/or alternative information may be transmitted with the notification as well, in some embodiments, such as a uniform resource identifier (URI) or other such identifying information.

In block 436, the application integration management platform 116 determines whether the application integration has been enabled by the application provider. If so, in block 438, the application integration management platform 116 performs any necessary provisioning operations, such as the provisioning of one or more accounts, users, hardware resources, etc. In block 440, the application integration management platform 116 establishes one or more communication channels with the unified collaboration application. In block 442, the application integration management platform 116 transmits messages to the unified collaboration application via the established communication channels.

Figure 5:
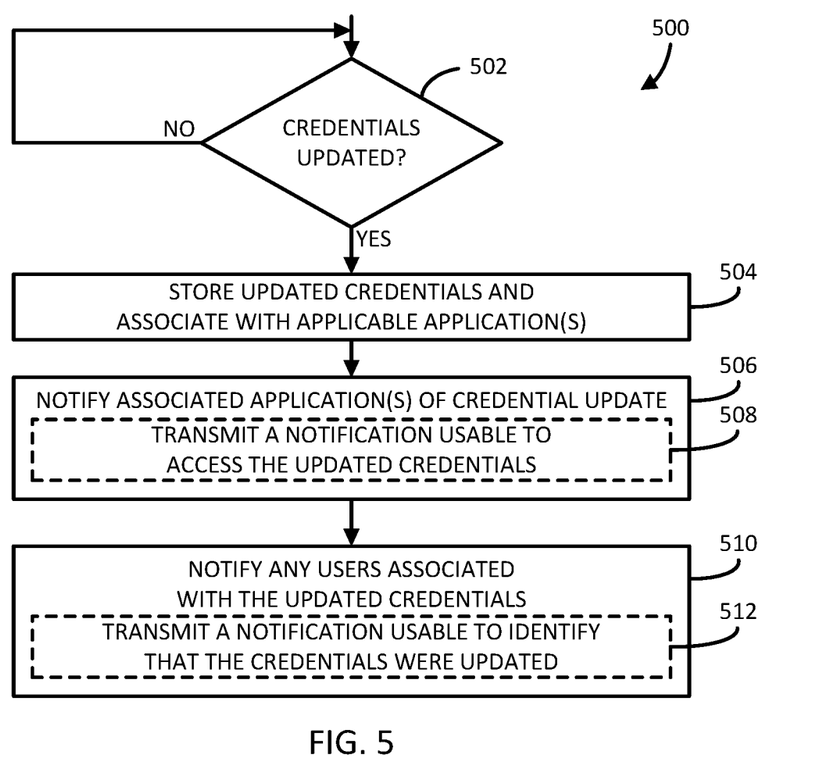
FIG. 5 is a simplified flow diagram of at least one embodiment of a method for managing credentials associated with application integrations associated with a unified collaboration application that may be executed by the centralized hub computing device of FIGS. 1 and 3.

Referring now to FIG. 5, an illustrative method 500 is provided for managing credentials associated with application integrations associated with a unified collaboration application, which may be executed by the centralized hub computing device 114, or more particularly the credential management platform 118 of the centralized hub computing device 114. The method 500 begins in block 502, in which the credential management platform 118 determines whether credentials have been updated. If so, the method 500 advances to block 504, in which the credential management platform 118 stores the updated credentials and associates the updated credentials with the applicable one or more applications.

In block 506, the credential management platform 118 notifies the one or more associated application(s) of the credential update. To do so, in block 508, the credential management platform 118 transmits a notification (i.e., an updated credentials notification) usable to access the updated credentials. Accordingly, in some embodiments, the updated credentials notification may include a URI and/or a unique identifier usable to identify the associated credentials, which can then be used (along with a well-known URI prefix) to construct a URI to call back into a REST endpoint (e.g., in the credential management platform 118) to obtain the appropriate credentials. Accordingly, subsequent requests made by the corresponding cloud application (e.g., one of the cloud applications 104 of FIG. 1) and/or associated application(s) transmitting a request to that URI can be authenticated and authorized before being allowed access to those credentials. In block 510, the credential management platform 118 notifies any users associated with the updated credentials of the update. To do so, in block 512, the credential management platform 118 transmits a notification usable to identify that the credentials were updated.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for managing application configurations and associated credentials of a unified collaboration application, the method comprising:
    receiving, by an application integration management platform of a centralized computing device, an indication from an end-user computing device that an integration of a cloud application is to be installed and linked to a unified collaboration application executed by a host computing device, the end-user computing device and the cloud application being communicatively coupled with the host computing device over a network;
    installing, by the application integration management platform, the integration;
    receiving, by the application integration management platform, configuration input for the integration from the end-user computing device;
    storing, by the application integration management platform, the configuration in an input application configuration database of the application integration management platform;
    receiving, by the application integration management platform, an enablement message from the end-user computing device indicating the integration is to be enabled; and
    transmitting, by the application integration management platform, an enablement notification to an application provider of the cloud application, wherein the enablement notification is usable to identify the integration;
    transmitting, by the application integration management platform, configuration setup information to the end-user computing device, wherein the configuration setup information is usable to display one or more user interface elements capable of requesting and receiving configuration input, and wherein receiving the configuration input for the integration from the end-user computing device comprises receiving the configuration input in response to the transmission of the configuration setup information.

2. The method of claim 1, wherein installing the integration includes generating a unique identifier of the integration and saving an application record that includes the unique identifier of the integration to an available applications database of the application integration management platform, wherein the available applications database is usable by a cloud application marketplace to identify available applications.

3. The method of claim 1, further comprising broadcasting, by the application integration management platform and subsequent to installing the integration, another notification to one or more services managed by the application integration management platform, wherein the other notification is usable to identify the installed integration and perform a subsequent action.

4. The method of claim 1, wherein transmitting the configuration setup information includes transmitting at least one of environment resource configuration information, integration type configuration information, and access credential configuration information.

5. The method of claim 1, further comprising storing, by the application integration management platform, the received configuration input in the application configuration database of the application integration management platform.

6. The method of claim 1, wherein transmitting the enablement notification to the application provider of the cloud application includes transmitting the enablement notification with information usable to access the stored configuration input.

7. The method of claim 1, wherein transmitting the enablement notification to the application provider of the cloud application includes transmitting the enablement notification with information usable to identify credentials associated with the integration.

8. The method of claim 1, further comprising:
    receiving, by the application integration management platform, a response to the enablement notification from the application provider of the cloud application; and
    performing, by the application integration management platform, one or more provisioning operations.

9. The method of claim 8, further comprising: establishing, by the application integration management platform, one or more communication channels with the unified collaboration application; and transmitting, by the application integration management platform, one or more messages to the unified collaboration application via the one or more communication channels.

10. The method of claim 1, further comprising:
    receiving, by a credential management platform of the centralized computing device, access credentials associated with the integration;
    storing, by the credential management platform, the received access credentials and an identifier of the integration in a credential database of the credential management platform; and
    transmitting, by the credential management platform, access credential information to the application provider of the cloud application, wherein the access credential information is usable to identify the access credentials associated with the integration.

11. The method of claim 10, further comprising: receiving, by the credential management platform, an update to the access credentials;
    storing, by the credential management platform, the received update to the access credentials in the credential database of the credential management platform;
    transmitting, by the credential management platform, an updated credentials notification to one or more associated applications and one or more associated users, wherein the updated credentials notification includes a unique identifier usable to identify the updated credentials.

12. A centralized hub computing device for managing application configurations and associated credentials of a unified collaboration application, the centralized hub computing device comprising:
    one or more computer-readable medium comprising instructions; and
    one or more processors coupled with the one or more computer-readable medium anti configured to execute the instructions to:
    receive an indication from an end-user computing device that an integration of a cloud application is to be installed and linked to a unified collaboration application executed by a host computing device, the end-user computing device and the cloud application being communicatively coupled with the host computing device over a network;

install the integration at the centralized hub computing device;

receive configuration input for the integration from the end-user computing device;

store the configuration in an input application configuration database of the application integration management platform;

receive a message from the end-user computing device indicating the integration is to be enabled; and transmit an enablement notification to an application provider of the cloud application, wherein the enablement notification is usable to identify the integration;

wherein the one or more processors are further configured to execute the instructions to transmitting, by the application integration management platform, configuration setup information to the end-user computing device, wherein the configuration setup information is usable to display one or more user interface elements capable of requesting and receiving configuration input, and wherein receiving the configuration input for the integration from the end-user computing device comprises receiving the configuration input in response to the transmission of the configuration setup information.

13. The centralized hub computing device of claim 12, wherein installing the integration includes generating a unique identifier of the integration and saving an application record that includes the unique identifier of the integration to an available applications database of the application integration management platform, wherein the available applications database is usable by a cloud application marketplace to identify available applications.

14. The centralized hub computing device of claim 12, wherein the one or more processors are further configured to execute the instructions to broadcasting, by the application integration management platform and subsequent to installing the integration, another notification to one or more services managed by the application integration management platform, wherein the other notification is usable to identify the installed integration and perform a subsequent action.

15. The centralized hub computing device of claim 1, wherein transmitting the configuration setup information includes transmitting at least one of environment resource configuration information, integration type configuration information, and access credential configuration information.

16. The centralized hub computing device of claim 12, wherein the one or more processors are further configured to execute the instructions to storing, by the application integration management platform, the received configuration input in the application configuration database of the application integration management platform.

17. The centralized hub computing device of claim 12, wherein to transmit the enablement notification to the application provider of the cloud application includes to transmit the enablement notification with information usable to access the stored configuration input.

18. The centralized hub computing device of claim 12, wherein to transmit the enablement notification to the application provider of the cloud application includes to transmit the enablement notification with information usable to identify credentials associated with the integration.

19. The centralized hub computing device of claim 12, wherein the one or more processors are further configured to execute the instructions to:
receive a response to the enablement notification from the application provider of the cloud application; and perform one or more provisioning operations.

20. The centralized hub computing device of claim 19, wherein the one or more processors are further configured to execute the instructions to:
establish one or more communication channels with the unified collaboration application; and transmit one or more messages to the unified collaboration application via the one or more communication channels.

21. The centralized hub computing device of claim 12, wherein the one or more processors are further configured to execute the instructions to:
receive access credentials associated with the integration;
store the received access credentials and an identifier of the integration in a credential database of the credential management platform; and
transmit access credential information to the application provider of the cloud application, wherein the access credential information is usable to identify the access credentials associated with the integration.

22. The centralized hub computing device of claim 21, wherein the one or more processors are further configured to execute the instructions to:
receive an update to the access credentials;
store the received update to the access credentials in the credential database of the credential management platform; and
transmit an updated credentials notification to one or more associated applications and one or more associated users, wherein the updated credentials notification includes a unique identifier usable to identify the updated credentials.

* * * * *